United States Patent
Sanchit et al.

(10) Patent No.: US 12,293,523 B2
(45) Date of Patent: May 6, 2025

(54) SYSTEMS AND METHODS FOR AUTOMATICALLY CROPPING DIGITAL IMAGES

(71) Applicant: Canva Pty Ltd, Surry Hills (AU)

(72) Inventors: Sanchit Sanchit, Vienna (AT); Paul Angerer, Vienna (AT)

(73) Assignee: Canva Pty Ltd, Surry Hills (AU)

( * ) Notice: Subject to any disclaimer, the term of this patent is extended or adjusted under 35 U.S.C. 154(b) by 0 days.

(21) Appl. No.: 18/600,625

(22) Filed: Mar. 8, 2024

(65) Prior Publication Data

US 2024/0331160 A1    Oct. 3, 2024

(30) Foreign Application Priority Data

Mar. 31, 2023 (AU) ................................ 2023202007

(51) Int. Cl.
*G06T 7/00* (2017.01)
*G06T 3/40* (2006.01)
(Continued)

(52) U.S. Cl.
CPC .................. *G06T 7/11* (2017.01); *G06T 3/40* (2013.01); *G06T 3/60* (2013.01); *G06V 10/25* (2022.01);
(Continued)

(58) Field of Classification Search
CPC ... G06T 2207/20132; G06T 3/40; G06T 7/11; G06T 2207/20084; G06T 2210/22; G06N 20/00; G06V 10/25; G06V 10/82; G06V 2201/07; H04N 1/3872; H04N 5/2628; H04N 21/440272
See application file for complete search history.

(56) References Cited

U.S. PATENT DOCUMENTS

2002/0191861 A1* 12/2002 Cheatle ................ H04N 1/3872
382/175
2013/0148880 A1* 6/2013 Kennedy .............. G06V 10/462
382/159
(Continued)

FOREIGN PATENT DOCUMENTS

WO    2022108601 A1    5/2022

OTHER PUBLICATIONS

Wang, Wenguan, Jianbing Shen, and Haibin Ling. "A deep network solution for attention and aesthetics aware photo cropping." IEEE transactions on pattern analysis and machine intelligence 41.7 (2018): 1531-1544.*

(Continued)

*Primary Examiner* — Li Liu
(74) *Attorney, Agent, or Firm* — GrowIP Law Group LLC

(57) ABSTRACT

Described herein is a computer implemented method for automatically generating a cropped version of an input image. The method includes processing the input image to detect a salient region of the input image and generating a set of crop candidates based on the salient region of the input image, each crop candidate defining a different image crop. A set of candidate scores is calculated, each corresponding to a crop candidate, and a first crop candidate is selected based on the set of scores. The cropped version of the input image is then generated based on the image crop defined by the first crop candidate.

20 Claims, 6 Drawing Sheets

(51) Int. Cl.
  *G06T 3/60* (2006.01)
  *G06T 7/11* (2017.01)
  *G06V 10/25* (2022.01)
  *G06V 10/46* (2022.01)
(52) U.S. Cl.
  CPC .. *G06V 10/462* (2022.01); *G06T 2207/20132* (2013.01)

(56) References Cited

U.S. PATENT DOCUMENTS

| | | | | |
|---|---|---|---|---|
| 2015/0161466 | A1* | 6/2015 | Welinder | G06V 10/25 |
| | | | | 382/195 |
| 2016/0117798 | A1* | 4/2016 | Lin | G06T 3/40 |
| | | | | 345/667 |
| 2018/0357803 | A1* | 12/2018 | Zhang | G06T 11/60 |
| 2020/0125880 | A1* | 4/2020 | Wang | G06V 10/449 |
| 2021/0041945 | A1 | 2/2021 | Cooper | |
| 2021/0248750 | A1 | 8/2021 | Dimson et al. | |
| 2021/0398333 | A1* | 12/2021 | Kalu | G06T 11/60 |
| 2023/0094362 | A1* | 3/2023 | Liu | G06T 7/60 |
| | | | | 382/100 |
| 2023/0319219 | A1* | 10/2023 | Vacura | H04N 5/2628 |
| | | | | 348/14.08 |
| 2024/0054748 | A1* | 2/2024 | Gonsalves | G06V 10/82 |
| 2024/0202929 | A1* | 6/2024 | Chou | G06T 7/12 |

OTHER PUBLICATIONS

Fang, Chen, et al. "Automatic image cropping using visual composition, boundary simplicity and content preservation models." Proceedings of the 22nd ACM international conference on Multimedia. 2014.*

Zeng, Hui, et al. "Reliable and efficient image cropping: A grid anchor based approach." Proceedings of the IEEE/CVF conference on computer vision and pattern recognition. 2019.*

A Simple Pooling-Based Design for Real-Time Salient Object Detection, https://github.com/backseason/PoolNet (last visited Mar. 16, 2023), pp. 1-4.

Basnet, https://github.com/xuebinqin/BASNet (last visited Mar. 16, 2023) (New Version May 2, 2021), pp. 1-6.

Bo Zhang et al., Image Composition Assessment with Saliency-augmented Multi-pattern Pooling, Oct. 18, 2021, pp. 1-28.

Daniel Saez, Correcting Image Orientation Using Convolutional Neural Networks: A hands-on introduction to deep learning applications, https://d4nst.github.io/2017/01/12/image-orientation/, Jan. 12, 2017, pp. 1-93.

Dong Liu, Composition-Aware Image Aesthetics Assessment, Jul. 25, 2019, pp. 1-10.

Examination Report No. 1 for Australian Patent Application No. 2023202007 mailed May 19, 2023, pp. 1-6.

Hui Zeng, Grid Anchor based Image Cropping: A New Benchmark and An Efficient Model, Sep. 18, 2019, pp. 1-15.

Jiang-Jiang Liu, A Simple Pooling-Based Design for Real-Time Salient Object Detection, Apr. 21, 2019, pp. 1-10.

Lin Zhao et al., Representation learning of image composition for aesthetic prediction, Computer Vision and Image Understanding, Jun. 24, 2020, pp. 1-10.

Peng Lu, An End-to-End Neural Network for Image Cropping by Learning Composition from Aesthetic Photos, Aug. 22, 2019, pp. 1-13.

RotNet, https://github.com/d4nst/RotNet (last visited Mar. 16, 2023), pp. 1-3.

Wang, W. et al., 'Deep Cropping via Attention Box Prediction and Aesthetics Assessment', arXiv:1710.08014v1, Oct. 22, 2017, pp. 1-9.

Wenguan Wang et al., A Deep Network Solution for Attention and Aesthetics Aware Photo Cropping, IEEE Transactions on Pattern Analysis and Machine Intelligence, vol. 41, Issue: 7, May 25, 2018, pp. 1-14.

Xuebin Qin et al., Boundary-Aware Segmentation Network for Mobile and Web Applications, May 11, 2021, pp. 1-19.

Xuebin Qin, U2-Net: Going Deeper with Nested U-Structure for Salient Object Detection, Mar. 8, 2022, pp. 1-15.

Cavalcanti CS V C et al: "Combining Multiple Image Features to Guide Automatic Portrait Cropping for Rendering Different Aspect Ratios", Signal-Image Technology and Internet-Based Systems (SITIS), 2010 Sixth International Conference on, IEEE, Dec. 15, 2010 (Dec. 15, 2010), pp. 66-73, XP031980420, DOI: 10.1109/SITIS.2010.21, ISBN: 978-1-4244-9527-6.

Extended European Search Report for EP Application No. 24166511 mailed Aug. 26, 2024, pp. 1-10.

* cited by examiner

SYSTEMS AND METHODS FOR AUTOMATICALLY CROPPING DIGITAL IMAGES

CROSS-REFERENCE TO RELATED APPLICATION

This application is a U.S. Non-Provisional application that claims priority to Australian Patent Application No. 2023202007, filed Mar. 31, 2023, which is hereby incorporated by reference in its entirety.

TECHNICAL FIELD

Aspects of the present disclosure are directed to systems and methods for automatically cropping digital images.

BACKGROUND

Digital images are used in a huge variety of contexts: photo albums, websites, social media services, advertising/marketing to name a few.

Once original digital images have been captured, a user will often manipulate (or edit) the image by an image editing application. A common manipulation performed by such applications are to crop the original image. This may be performed, for example, to improve (or at least change) the composition of the original image and/or to change the aspect ratio of the original image.

Manual image cropping is typically a straight forward process that can be performed in any number of ways. For users who are not skilled, however, performing a crop that provides a good aesthetic result can be challenging and time consuming. For example, a user without experience may need to perform many crop operations in a trial and error process before finding a crop they are happy with.

Even for experienced users, image cropping can be a tedious task-particularly where a user has to crop a large number of images.

SUMMARY

Described herein is a computer implemented method for automatically generating a cropped version of an input image, the method including: processing the input image to detect a salient region of the input image; generating a set of crop candidates based on the salient region of the input image, each crop candidate defining a different image crop; calculating a set of candidate scores, each candidate score corresponding to a crop candidate; selecting a first crop candidate based on the set of crop candidate scores; and generating the cropped version of the input image based on the image crop defined by the first crop candidate.

Figure 1:
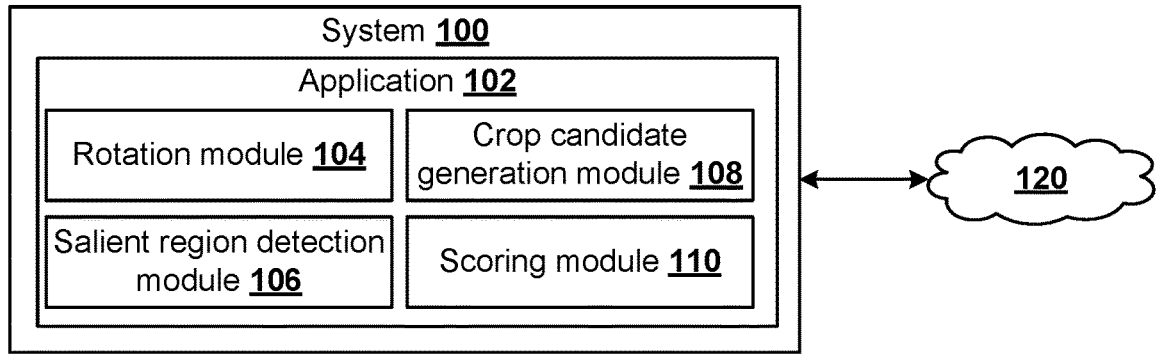
FIG. 1 is a diagram depicting a system for performing various features of the present disclosure.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

As discussed above image cropping is a common operation performed on digital images. The present disclosure is directed to systems and methods for automatically cropping (or automatically suggesting a crop) for a digital image.

Automatic cropping provides a number of advantages.

Where a user lacks experience, automatic cropping may provide a better result from an aesthetics (e.g. image composition) perspective than would be obtained by the user manually cropping the image (or, at least, may provide a better result without the user having to perform multiple crop operations in a trial and error process).

Moreover, where a user (experienced or otherwise) needs to crop a large number of images, automatic cropping can streamline this process and significantly reduce the time and user input required to perform the crop operations. This, in turn, may reduce processing cycles and power consumption of a device (or set of devices) that are involved in performing the crop operations as each image can be automatically cropped without having to separately display the image and receive user input defining the desired crop.

In order to crop an image in a meaningful way, the automatic cropping techniques described herein generate (in some instances) multiple crop candidates that are based on the most interesting or salient part of the image. Each crop candidate is then scored in order to identify the best crop candidate, which can then be used to actually crop the input image.

The techniques disclosed herein are computer implemented techniques that are performed by one or more computer processing systems. FIG. 1 depicts an example computer processing system 100. System 100 may be any suitable type of computer processing system, for example a desktop computer, a laptop computer, a tablet device, a smart phone device, a server computer, or an alternative computer processing system. System 100 may, for example, have an architecture that is the same as (or similar to) system 200 described below.

In the present example, computer system 100 is configured to perform the functions described herein by execution of a software application (or a set of software applications) 102—that is, computer readable instructions that are stored in a storage device (such as non-transitory memory 210 described below) and executed by a processing unit of the system 100 (such as processing unit 202 described below).

In the present example, application 102 displays a user interface that allows a user to trigger an automatic image cropping process and to review results of that process. In this example, application 102 also includes various modules which interoperate to automatically crop input images. These modules are discussed below, however include: a rotation module 104 a salient region detection module 106, a crop candidate generation module 108, and a scoring module 110.

In the present example, system 100 is connected to a communications network 120. Via network 120, system 100 can communicate with (e.g. send data to and receive data from) other computer processing systems (not shown).

Figure 2:
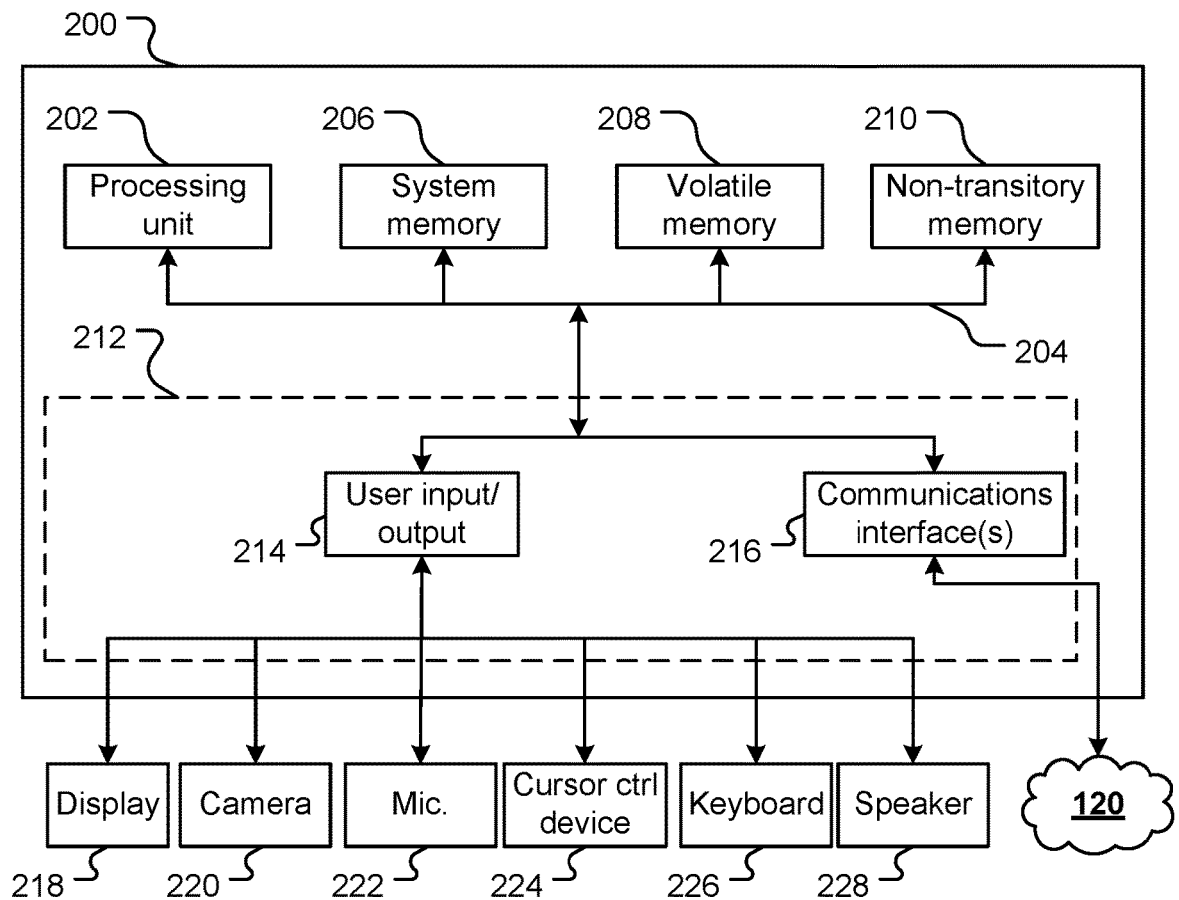
FIG. 2 is a block diagram of an example computer processing system.

Turning to FIG. 2, a block diagram of a computer processing system 200 configurable to implement embodiments and/or features described herein. For example, system 100 of FIG. 1 may be a computer processing such as that show in FIG. 2 (though alternative architectures are possible).

System 200 is a general purpose computer processing system. It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 200 includes at least one processing unit 202. The processing unit 202 may be a single computer processing device (e.g. a central processing unit, graphics processing unit, or other computational device), or may include a plurality of computer processing devices. In some instances, where a computer processing system 200 is described as performing an operation or function all processing required to perform that operation or function will be performed by processing unit 202. In other instances, processing required to perform that operation or function may also be performed by remote processing devices accessible to and useable (either in a shared or dedicated manner) by system 200.

Through a communications bus 204 the processing unit 202 is in data communication with a one or more machine readable storage (memory) devices which store computer readable instructions and/or data which are executed by the processing unit 202 to control operation of the processing system 200. In this example, system 200 includes a system memory 206 (e.g. a BIOS), volatile memory 208 (e.g. random access memory such as one or more DRAM modules), and non-transitory memory 210 (e.g. one or more hard disk or solid state drives).

System 200 also includes one or more interfaces, indicated generally by 212, via which system 200 interfaces with various devices and/or networks. Generally speaking, other devices may be integral with system 200, or may be separate. Where a device is separate from system 200, the connection between the device and system 200 may be via wired or wireless hardware and communication protocols, and may be a direct or an indirect (e.g. networked) connection.

Generally speaking, and depending on the particular system in question, devices to which system 200 connects include one or more input devices to allow data to be input into/received by system 200 and one or more output device to allow data to be output by system 200. Example devices are described below, however it will be appreciated that not all computer processing systems will include all mentioned devices, and that additional and alternative devices to those mentioned may well be used.

For example, system 200 may include or connect to one or more input devices by which information/data is input into (received by) system 200. Such input devices may, for example, include a keyboard, a pointing device (such as a mouse or trackpad), a touch screen, and/or other input devices. System 200 may also include or connect to one or more output devices controlled by system 200 to output information. Such output devices may, for example, include one or more display devices (e.g. a LCD, LED, touch screen, or other display devices) and/or other output devices. System 200 may also include or connect to devices which act as both input and output devices, for example touch screen displays (which can receive touch signals/input and display/output data) and memory devices (from which data can be read and to which data can be written).

By way of example, where system 200 is an end user device such as (such as system 100), it may include a display 218 (which may be a touch screen display), a camera device 220, a microphone device 222 (which may be integrated with the camera device), a cursor control device 224 (e.g. a mouse, trackpad, or other cursor control device), a keyboard 226, and a speaker device 228.

System 200 also includes one or more communications interfaces 216 for communication with a network, such as network 120 of FIG. 1. Via the communications interface(s) 216, system 200 can communicate data to and receive data from networked systems and/or devices.

System 200 may be any suitable computer processing system, for example, a server computer system, a desktop computer, a laptop computer, a netbook computer, a tablet computing device, a mobile/smart phone, a personal digital assistant, or an alternative computer processing system.

System 200 stores or has access to computer applications (which may also referred to as computer software or computer programs). Generally speaking, such applications include computer readable instructions and data which, when executed by processing unit 202, configure system 200 to receive, process, and output data. Instructions and data can be stored on non-transitory machine readable medium such as 210 accessible to system 200. Instructions and data may be transmitted to/received by system 200 via a data signal in a transmission channel enabled (for example) by a wired or wireless network connection over an interface such as communications interface 216.

Typically, one application accessible to system 200 will be an operating system application. In addition, system 200 will store or have access to applications which, when executed by the processing unit 202, configure system 200 to perform various computer-implemented processing operations described herein. For example, and referring to FIG. 1 above, system 100 includes (and executes) application 102.

In some cases part or all of a given computer-implemented method will be performed by system 200 itself, while in other cases processing may be performed by other devices in data communication with system 200.

Figure 3:
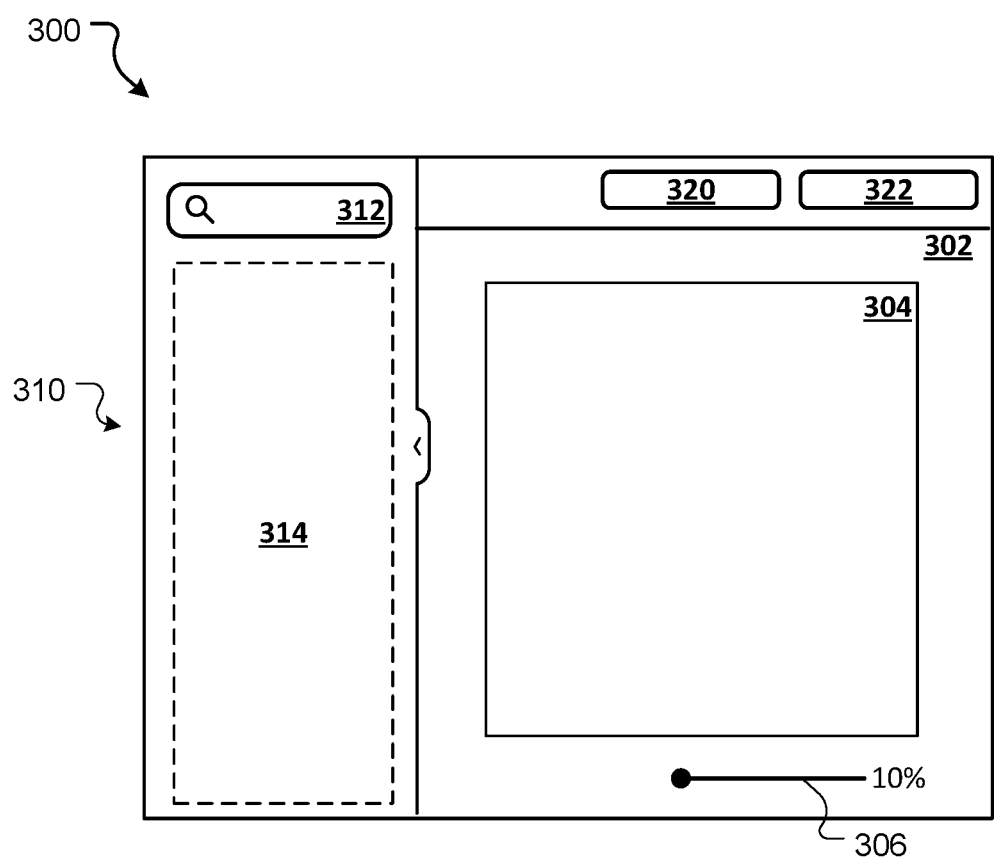
FIG. 3 depicts an example user interface.

In the present disclosure, application 102 configures system 100 to provide a user interface (UI). FIG. 3 provides a simplified and partial example of a UI 300 that application 102 may display (e.g. on display 218).

In this example, UI 300 is a graphical user interface (GUI) that includes a preview area 302 in which a selected digital image 304 is displayed. UI 300 also includes a zoom control 306 which a user can interact with to zoom into/out of the image 304 currently displayed.

In this example, UI 300 also includes a search UI 310 which, generally, provides controls for a user to search or browse for digital images (which can then be selected for display and/or automatic cropping as described below). In this example, search UI 310 includes a search control 312 via which a user can submit search data (e.g. a string of characters) to search for particular images. Search UI 310 may also include a directory structure or the like (generally indicated at 314) which a user can use to browse through accessible images. In this context, accessible images may be images stored on locally accessible memory (e.g. on non-transitory memory 210 and/or an alternative disk drive) or remotely accessible images (e.g. images stored on a networked storage device, cloud storage service, or other remote service and accessible over network 120).

In the present example, UI 300 also includes an auto-crop control 320 (the operation of which will be described below) and an output image control 322. Generally speaking, a user may use the output image control to save or otherwise output an image. Application 102 may provide various options for outputting an image. For example, application 102 may provide a user with options to output an image by one or more of: saving the image to local memory (e.g. non-transitory memory 210 or an alternative drive); saving the image to a remote storage location (e.g. a networked storage device, cloud storage service, or other remote storage service); printing the image to a printer (local or networked); sending the image to another user (e.g. by attaching the image to an email, instant message, or other electronic communication); publishing the image to a social media platform or other service (e.g. by sending the image to a third party server system with appropriate API commands to publish the image); and/or by other output means.

Alternatives to UI 400 are possible and may include additional, fewer, or alternative controls and UI elements as those described above.

Figure 4:
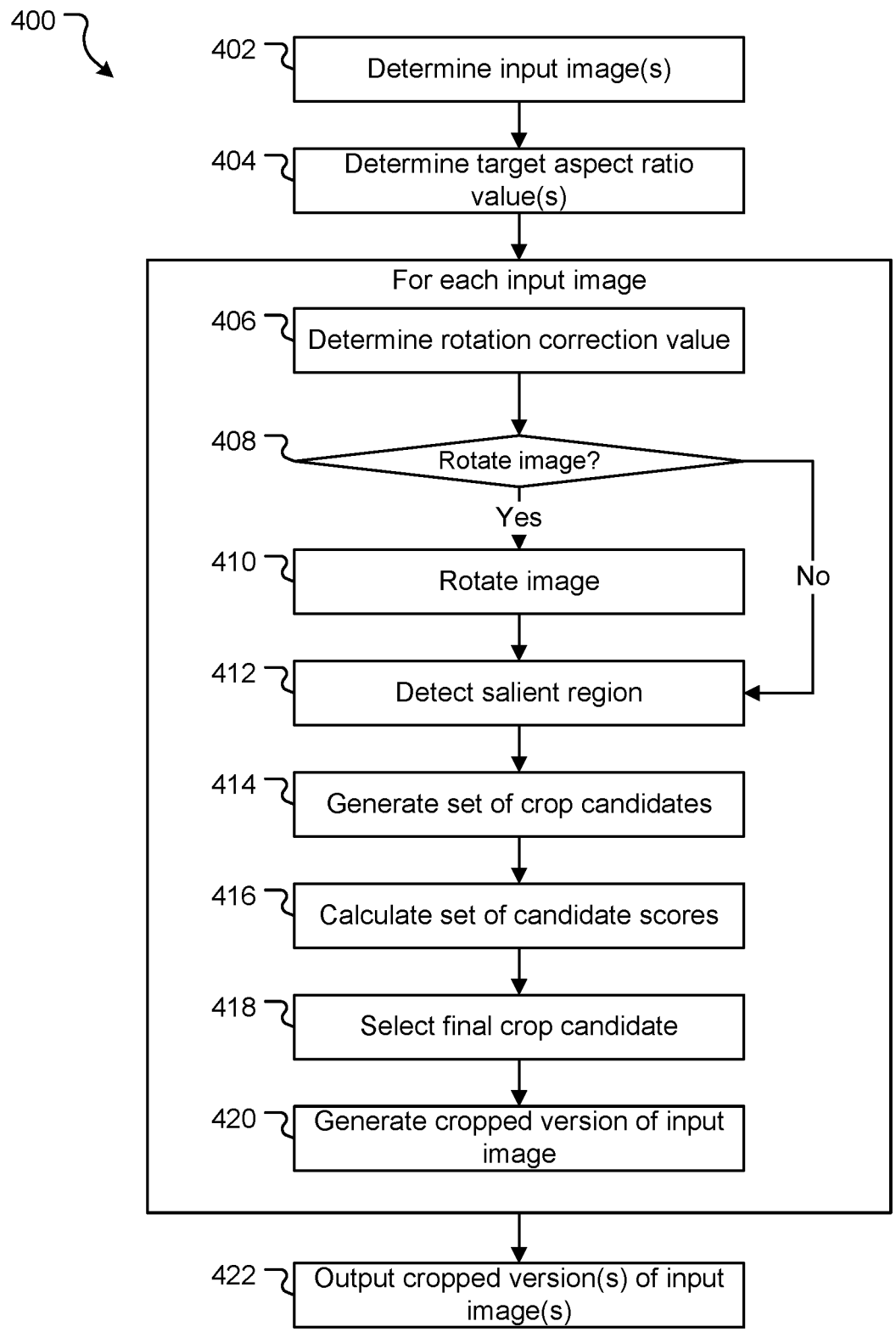
FIG. 4 is a flowchart depicting operations performed to auto rotate one or more input images.

Turning to FIG. 4, a method 400 for automatically cropping an input image will be described. The operations of method 400 will be described as being performed by application 102 (and the various associated modules) running on system 100. The operations could, however, be performed by or more alternative applications running on system 100 or one or more alternative systems.

Application 102 may be configured to perform processing according to method 400 in response to detecting various trigger events. As one example, user activation of a user interface control (such as auto-crop control 320 of UI 300 described above) may be a trigger event.

At 402, application 102 determines one or more input images that are to be automatically cropped. This may be done in various ways.

As one example, where the event triggering method 400 is activation of a UI control (such as control 320) and an image has already been opened/selected (and, for example, is displayed in a preview region such as 302), application 102 may determine that the open image is the input image.

Alternatively, in response to detecting activation of the auto-crop control 320, application 102 may display (e.g. in search UI 310 or an alternative UI or UI region) an image selection user interface that allows a user to search or browse for images and to select one or more images for auto cropping.

At 404, application 102 determines a target aspect ratio value for each input image. In the present embodiment, three target aspect ratio values are possible: a value (e.g. a first value) indicating that the target aspect ratio is the same as the aspect ratio of the original image; a value (e.g. a second value) indicating a specific target aspect ratio; or a value (e.g. a third value) indicating that the target aspect ratio should be automatically determined.

Application 102 may determine the target aspect ratio for the input image(s) based on user input. As one example, application 102 may display an aspect ratio selection UI that allows a user to select between two or more of: an "auto" target aspect ratio option (indicating that application 102 should automatically determine the aspect ratio); an "original" target aspect ratio option (indicating the original aspect ratio of the input image should be used); and a specific/user-defined target aspect ratio option (which allows the user to specify a particular aspect ratio).

Figure 5:
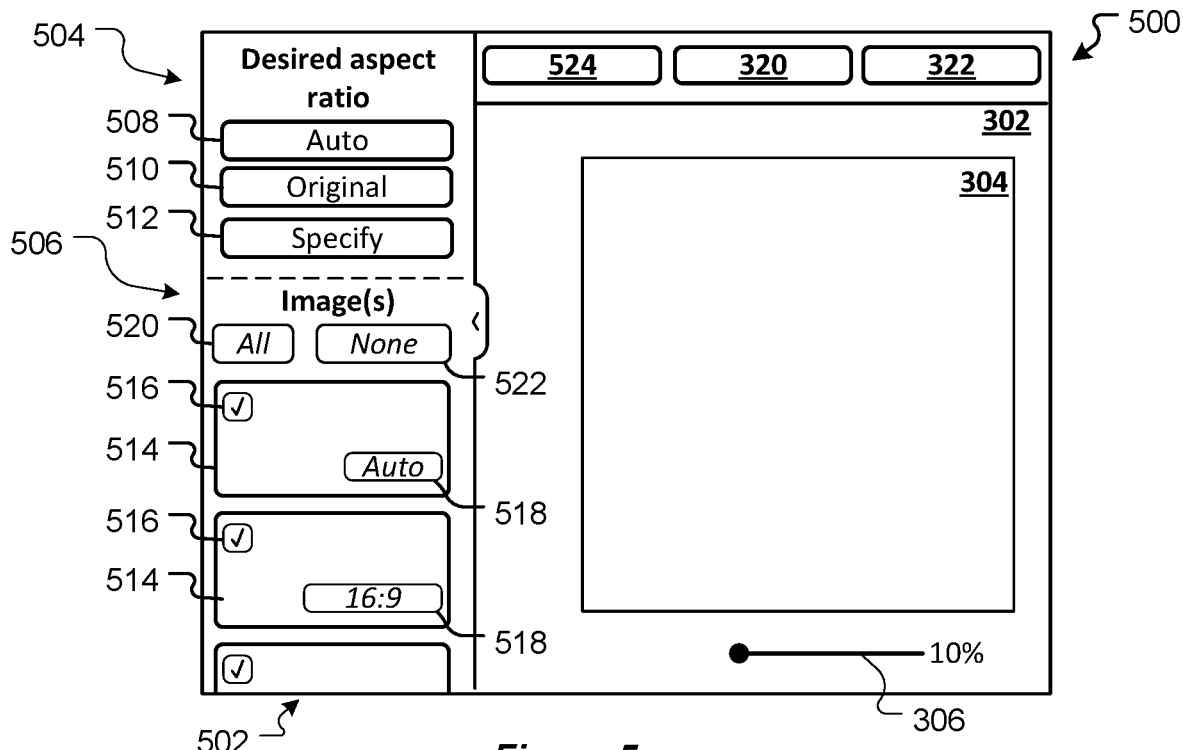
FIG. 5 depicts an example user interface.

Application 102 may provide any appropriate UI (or set of UIs) as the aspect ratio selection UI. FIG. 5 depicts one example of a UI 500. UI 500 is similar to UI 300 of FIG. 3, excepting the search UI 310 has been replaced with an aspect ratio selection UI 502. In this example, application 102 displays an aspect ratio selection region 504 (which includes controls used to select a desired target aspect ratio option) and an image selection region 506 (which includes controls allowing a user to select one or more of the input images to apply the desired aspect ratio to).

In this example, Application 102 provides three aspect ratio selector controls corresponding to the three target aspect ratio options described above: an auto control 508 which, if selected, indicates that application 102 is to automatically determine a target aspect ratio; an original control 510 which, if selected, indicates that application 102 is to use the aspect ratio of the original image as the target aspect ratio; and a specify control 512, which allows a user to specify a target aspect ratio. Specify control may be a drop-down list that allows a user to select from a predefined set of common aspect ratios, and/or may provide a text entry box that allows a user to enter a width and a height.

In this example, image selection region 506 displays a thumbnail 514 of each image that has been selected (e.g. at 402) for auto cropping. Each thumbnail includes a checkbox 516. If a target aspect ratio option has been selected for (and associated with) an image, its preview 514 also includes an indicator 518 indicating the selected option. In addition, an "all" control 520 (which allows a user to select all input images) and a "none" control 522 (which allows a user to deselect all input images) are displayed. In order to select a particular target aspect ratio option for a particular image (or set of images), a user may select one or more images (e.g. via checkbox 516 or "all" control 520) and then select the desired target aspect ratio option control. E.g. to associate a specified aspect ratio of 16:9 to all input images, a user may activate the "all" control (to select all input images) and then activate the "specify" control 512 (and select or enter an aspect ratio of 16:9).

UI 500 also includes a continue control 524, activation of which indicates that a user has finished selecting target aspect ratio options for the input images. If a target aspect ratio option has not been set for any input image, application 102 may apply a default option (e.g. Auto, original, or a specific aspect ratio), or may notify the user that a target aspect ratio option has not been set for one or more of the input images.

Alternatives to UI 500 are possible and may include additional, fewer, or alternative controls and UI elements as those described above.

In alternative embodiments, application 102 is configured to operate with a default target aspect ratio value—e.g. so that the target aspect ratio is always automatically determined (or, alternatively, is always the original image aspect ratio or is always a defined aspect ratio). In this case no determination may be needed at 404 (and no UI for specifying target aspect ratios need be provided).

In the present embodiments, application 102 is configured to permit selection of multiple input images (thus providing for batch auto cropping). In alternative embodiments, however, application 102 may instead restrict input image selection to a single image at a time.

Furthermore, while application 102 may be configured to provide graphical user interfaces for a user to select input images and associated target aspect ratio options, this need not be the case. For example, application 102 may provide (or be accessible via) a command line interface that allows a user to initiate auto cropping by an appropriate command, an argument that specifies the location of an input image or set of input images, and (optionally) an argument that allows a user to specify a desired target aspect ratio option for the/or each input image.

As a further example, application 102 may provide one or more user interfaces that allow a user to populate a table that indicates the input image(s) (e.g. via a directory path, a URL, or an alternative identifier) and an associated target aspect ratio option for each input image. Such a table may take a form such as the following:

| Input image | Target aspect ratio option |
|---|---|
| C:\images\1.jpg | Auto |
| C:\images\2.jpg | 3:4 |
| C:\images\3.jpg | 16:9 |
| C:\images\4.jpg | Original |
| C:\images\4.jpg | Auto |

In this example, image "4.jpg" has been included twice: once associated with the "original" target aspect ratio option, and once associated with the "auto" target aspect ratio option. In a case such as this, application 102 will perform auto cropping on image "4.jpg" twice (and generate two separate output images/image versions): once using the original aspect ratio as input, and once by automatically determining an aspect ratio.

As yet a further example, application 102 may provide one or more user interfaces that allow a user to upload a file that defines a table such as the above (e.g. in a csv or other appropriate format).

Following 404, application 102 has determined one or more input images that are to be auto cropped and (in the present embodiments) an associated target aspect ratio option for each input image. Each input image is then processed separately to generate a corresponding output (cropped) image. Where multiple input images are defined they may be processed sequentially in any order or in parallel.

At 406, application 102 processes the selected input image to determine whether a rotation correction value. In the present embodiment, the rotation module 104 (module 104 for short) is used to determine a rotation correction value—e.g. a number of degrees that module 104 determines that the image should be rotated by to correct what may be an unintentional misalignment of the original input image (e.g. an off-horizontal horizon or the like).

Module 104 may be configured to process the selected image to determine such a rotation correction value in various ways. Module 104 may implement any appropriate rotation correction algorithm that, generally speaking, takes as input an image and returns a value that indicates a predicted rotation that should be performed.

As one specific example, module 104 may determine the rotation correction value by processing the selected input image according to a rotation correction process as described in Australian patent application AU 2023202005 (titled "Image rotation" and filed on 31 Mar. 2023), the contents of which are incorporated herein by reference. As another example, an approach such as that used in the RotNet Git Hub repository (https://github.com/d4nst/RotNet, as at 16 Mar. 2023) and described in the post "*Correcting Image Orientation Using Convolutional Neural Networks: A hands-on introduction to deep learning applications*" by Daniel Saez may be used.

At 408, application 102 determines whether or not to rotate the selected input image. In the present embodiment, application 102 determines this based on a threshold rotation range: if the rotation correction value determined at 406 falls within the threshold rotation range, application 102 determines that the image should be rotated (and processing proceeds to 410). If not, application determines that the input image should not be rotated (and processing proceeds to 412). In certain implementations, the threshold rotation range is -15 degrees to +15 degrees (though other ranges may be applied). This range is selected on the rationale that if a rotation correction value outside this range is determined there is a high likelihood that the original image has been deliberately captured in its original form.

At 410, application 102 rotates the selected input image according to the rotation correction value determined at 406. Processing then proceeds to 412.

At 412, application 102 determines the salient region of the input image (as rotated at 410 if applicable). In the present embodiment, the salient region detection module 106 (module 106 for short) is used to determine the salient region of the selected input image.

Module 106 may be configured to determine the salient region (or object) of the selected input image in various ways. As one example, module 106 may process the selected input image (as rotated at 410 if applicable) using a machine learning model that has been trained to determine the salient region (or salient object) therein. The trained machine learning model may, for example, be a pre-trained $U^2$-Net model as generally described in the paper "*$U^2$-Net: Going Deeper with Nested U-Structure for Salient Object Detection*" by Xuebin Qin, Zichen Zhang, Chenyang Huang, Masood Dehghan, Osmar R. Zaiane and Martin Jagersand (arXiv: 2005.09007v3).

Alternative approaches for determining a salient region of the input image may be used. For example, an approach such as that described in the paper "*A Simple Pooling-Based Design for Real-Time Salient Object Detection*" by Jiang-Jiang Liu, Qibin Hou, Ming-Ming Cheng, Jiashi Feng, Jianmin Jiang (arXiv: 1904.09569v1) may be used. As a further example, an approach such as that described in the paper "*Boundary-Aware Segmentation Network for Mobile and Web Applications*", by Xuebin Qin, Deng-Ping Fan, Chenyang Huang, Cyril Diagne, Zichen Zhang, Adria Cabeza Sant' Anna, Albert Suarez, Martin Jagersand, and Ling Shao (arXiv: 2101.04704v2) may be used.

In the present embodiment, module 106 returns salient region data in the form of a mask. The mask includes a set of mask values, each mask value corresponding to a pixel of the selected input image (as rotated at 410 if applicable). The original values of the mask (which are values between 0 1 nd 1) are converted to values of either 1 (indicating that the corresponding input image pixel is part of the salient region) or 0 indicating that the corresponding input pixel is not part of the salient region—e.g. it is background). This conversion may be performed by applying a threshold to the original mask values, e.g. a threshold of 0.15 (or an alternative threshold value).

At 414, application 102 generates a set of crop candidates for the selected input image. The generation of crop candidates is described below with reference to FIG. 7. Each crop candidate in the set of crop candidates will define a different image crop. A crop candidate may define an image crop in various ways, but will generally include data (e.g. crop coordinates) that allows minimum x, maximum x, minimum y, and maximum y coordinates for the crop to be determined. A given crop candidate may explicitly define these four values, or may define other data from which they can be calculated (e.g. a minimum x, a minimum y, a crop width, and a crop height).

At 416, application 102 calculates a set of candidate scores. Each candidates score that is calculated corresponds to a crop candidate generated at 414. In the present example, candidate scores are calculated by the scoring module 110.

Generally speaking, a candidate score calculated by module 110 provides a measure of the aesthetic and/or compositional quality of the crop candidate the score corresponds to. Module 110 may calculate such a score for a selected crop candidate in various ways. As one example, module 110 may process the selected crop candidate (or, more specifically, a version of the selected input image as rotated at 410 if necessary and as cropped in accordance with the selected crop candidate) using a machine learning model that has been trained to return a score that is based on an aesthetic and/or compositional quality. The trained machine learning model may, for example, be a pre-trained ReLIC++ composition model as generally described in the following paper may be used: Lin Zhao, Meimei Shang, Fei Gao, et al. *Representation Learning of Image Composition for Aesthetic Prediction*. Computer Vision and Image Understanding (CVIU), vol. 199, 103024, October 2020.

Alternative approaches for calculating image scores may be used. For example, an approach such as that described in the paper "*Image Composition Assessment with Saliency-augmented Multi-pattern Pooling*" by Bo Zhang, Li Niu, Liqing Zhang (arXiv: 2104.03133v2) may be used. As a further alternative example, an approach such as that described in the paper "*Composition-Aware Image Aesthetics Assessment*", WACV 2020, Dong Liu, Rohit Puri, Nagendra Kamath, Subhabrata Bhattacharya.

At 418, application 102 selects a final crop candidate for the selected input image based on the candidate score(s) calculated at 416 (e.g. the compositional aesthetic score value provided by the ReLIC++ model). Application 102 will select the crop candidate with the most favourable candidate score-which may be the highest candidate score. If multiple crop candidates have the same score, application 102 may select any one of the candidates that has the equal highest score (or may select all candidates that have the equal highest score to be output as different crop options).

At 420, application 102 generates a cropped version of the selected input image. The cropped version is based on the final crop candidate selected at 418. Application 102 may be configured to generate a cropped version of the selected input image in various ways. For example, application 102 may be configured generate a cropped version in a non-destructive way: e.g. by associating relevant crop data with the selected input images so that when the image is displayed it is displayed according to hat crop data (but a user can undo the crop to return to the original image). Alternatively, application 102 may be configured to generate the cropped version by creating a copy of the selected input image, cropping the copy according to the selected crop candidate, and outputting the copy. Further alternatively, application 102 may be configured generate a cropped version in destructive way: e.g. by cropping the original image (discarding the cropped data).

At 424, application 102 outputs the cropped version(s) of the input image(s). Application 102 may be configured to output cropped versions in various ways, and (for example) depending on whether auto cropping has been run in a batch mode or not.

Figure 6:
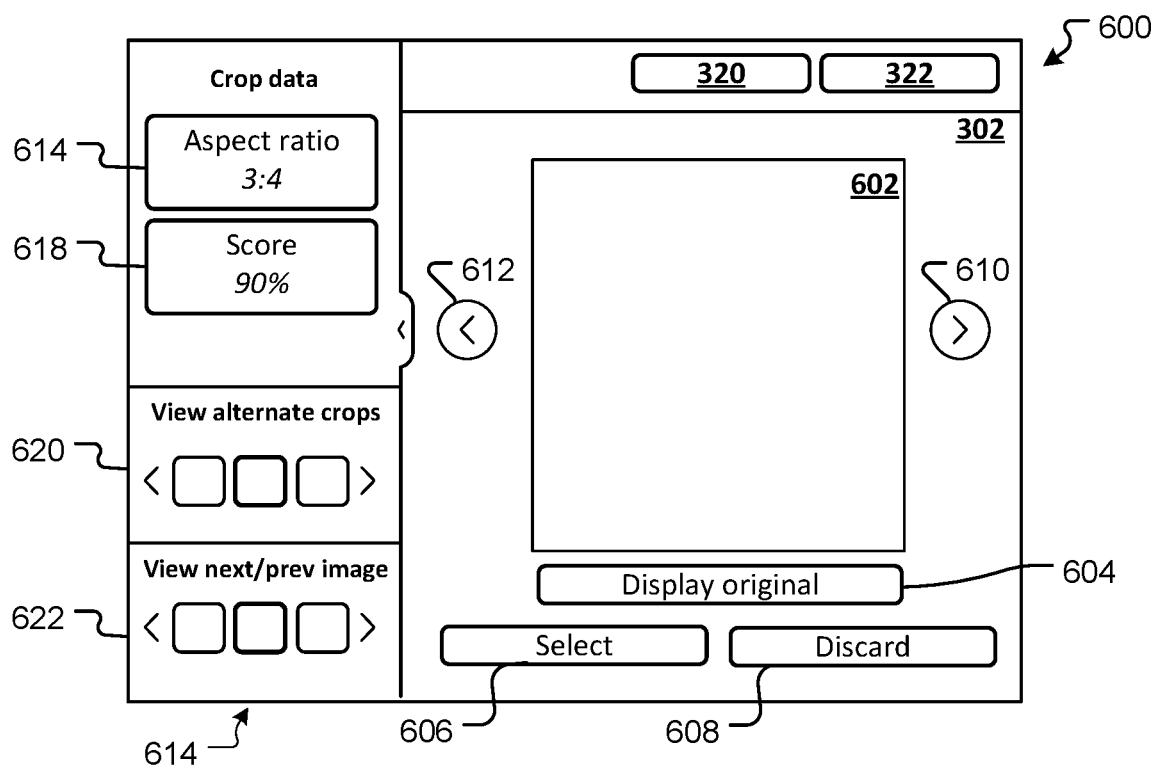
FIG. 6 depicts an example user interface.

In the present embodiment, application 102 is configured to display a UI that allows a user to preview cropped version(s) of the input image(s) and select whether to keep or discard the cropped version. FIG. 6 depicts one example of such a UI 600. UI 600 is similar to UI 300 of FIG. 3, however preview area 302 includes additional controls (602-612), and search UI 310 has been replaced with a cropped image UI 614.

In this example, the preview area 302 of UI 600 includes: a preview 602 of particular crop version of a particular input image; a "display original" control 604 (which, if selected, causes application 102 to display the original image that preview 602 corresponds to); a "select" control 606 (which, if selected, causes application 102 to save the cropped version of preview 602 and display a preview 602 of the cropped version of a next input image (if any)); a "discard" control 608 (which, if selected, causes application 102 to discard the cropped version of preview 602 and display a preview 602 of the cropped version of a next input image (if any)); a "next image" control 610 (which, if selected, causes application 102 to display a preview 602 of the cropped version of a next input image (if any)); and a previous image control 612 (which, if selected, causes application 102 to display a preview 602 of the cropped version of a previous input image (if any)).

By activation of control 322, a user may select to output the cropped version of the input image corresponding to preview 602 in different ways—e.g. communicating to another person, publishing to social media service or website, printing, or otherwise outputting the version of the image.

In the present example, the cropped image UI 614 includes: an aspect ratio indicator 616 (which indicates the aspect ratio of the preview 602); a score indicator 618 (which indicates the candidate score that was calculated for the cropped version shown by preview 602); one or more view alternate crop controls 620, via which a user may view previews of the current input image cropped according to alternate crop candidates (e.g. crop candidates that resulted in a less favourable candidate score and thus were not selected as the final crop candidate selected at 418); one or more view alternate design controls 622, via which a user may select to view previews of the cropped versions of other input images (similar to next and previous image controls 610 and 612 discussed above).

Alternatives to UI 600 are possible and may include additional, fewer, or alternative controls and UI elements as those described above.

A UI such as UI 600 above may be appropriate where there is a single input image or a relatively limited number of input images. Where there are a large number of input images application 102 may output the cropped versions of those images in a different way. In this case, and by way of example, application 102 may output the cropped versions by automatically saving them (without providing any preview or ability for a user to select/discard a given version). Where each cropped version is a copy of the corresponding input image, application 102 may save these copies to a default location (which may be the same location as the input images or a subdirectory of that location) using a defined file—e.g. "<original file name>—auto crop" (or any other file name). In addition, application 102 may display a progress indicator as the cropped versions are being generated, and on completed display a message indicating that cropped versions have been generated. Such a message may include an indication (or a link in the case of a GUI message) to the location at which the cropped versions have been saved and can be accessed.

Figure 7:
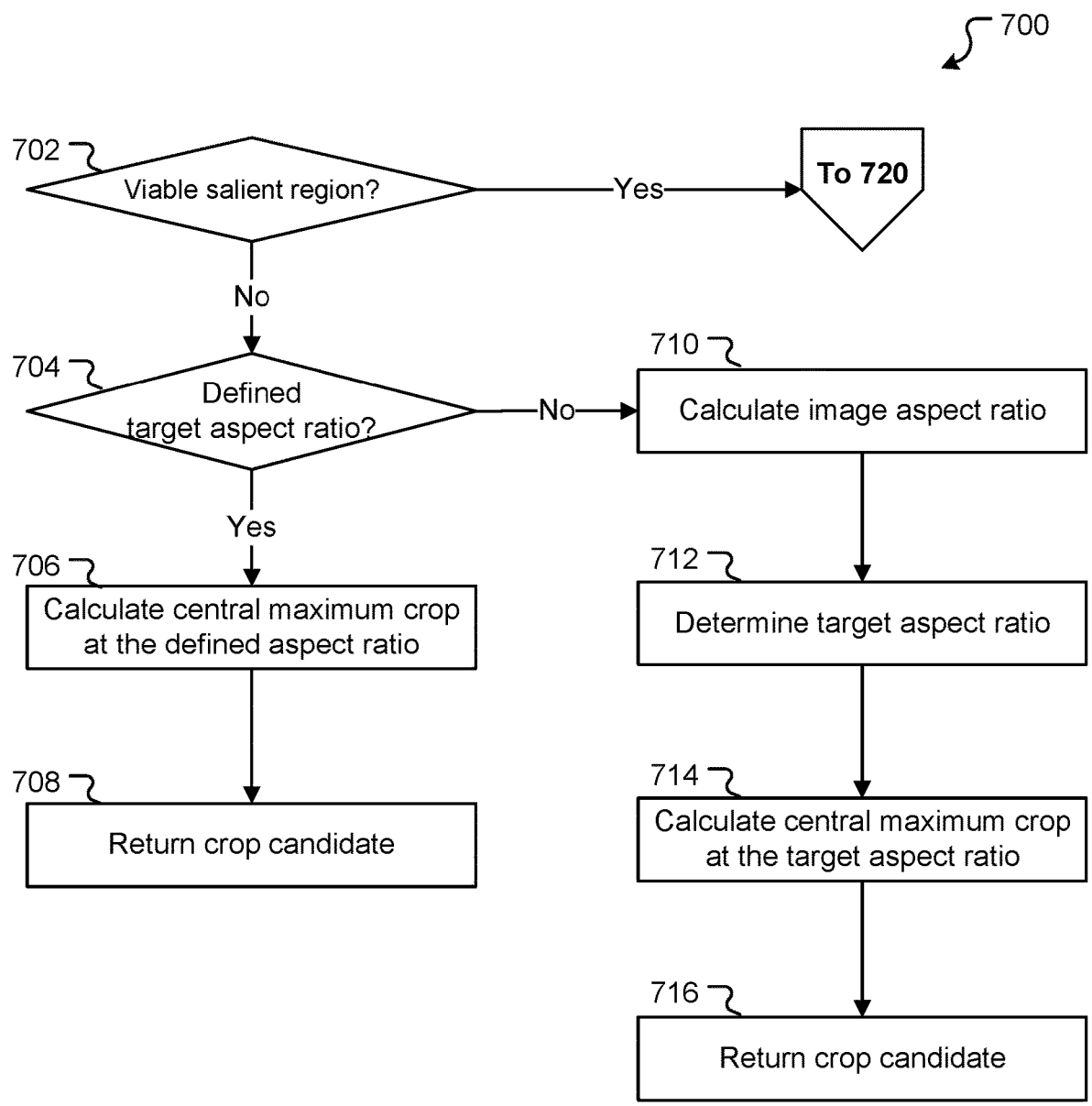
FIG. 7 is a flowchart depicting operations for generating a set of one or more crop candidates for an input image.
Figure 7:
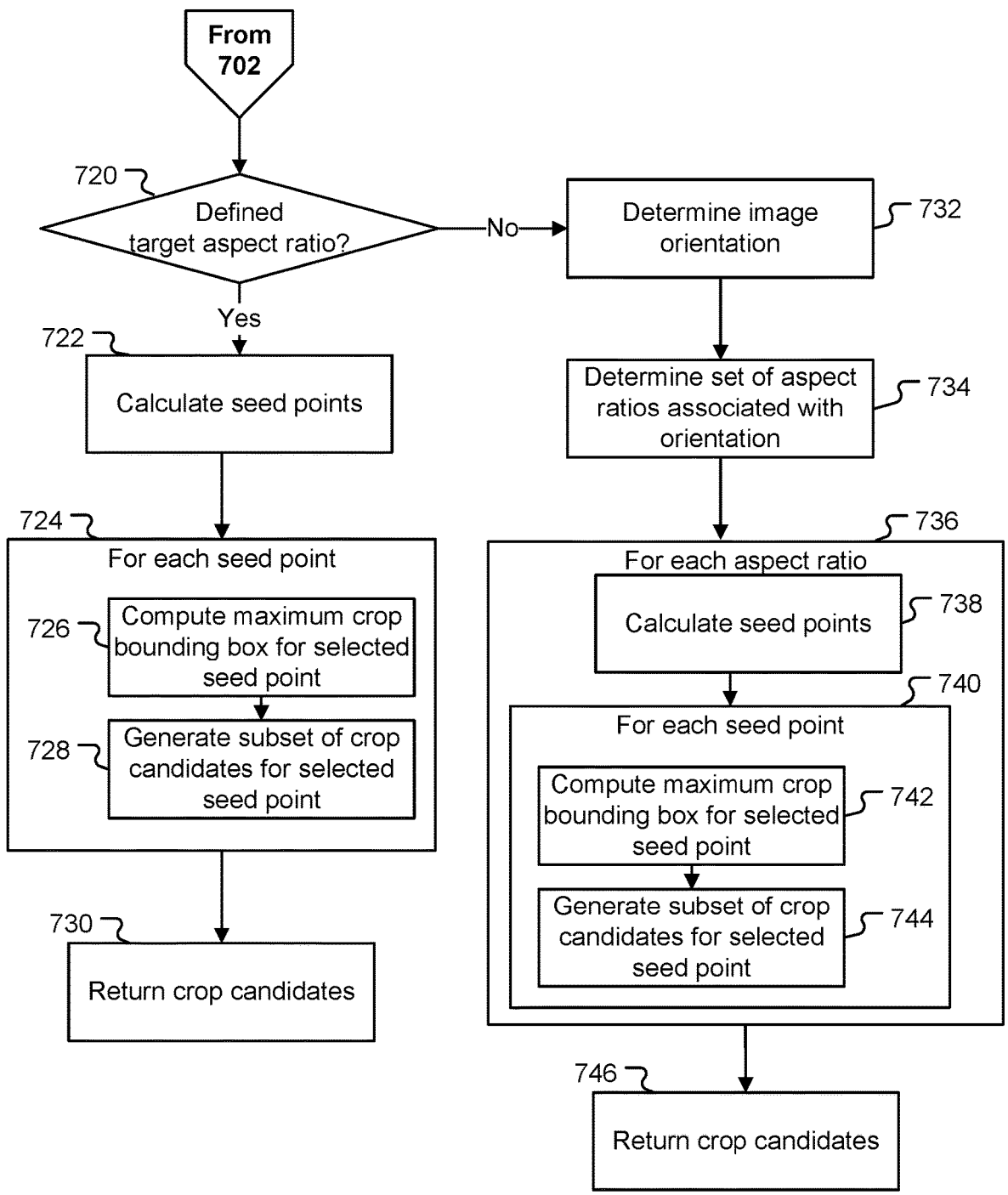

At 414 described above, one or more crop candidates for the selected input image are generated. Turning to FIG. 7, and example method 700 for generating crop candidates for a selected image (referred to as the input image) will be described. In the present embodiment, crop candidates are generated by the crop candidate generation module 108 (module 108 for short).

In the present embodiment, module 108 is configured to perform different crop candidate generation operations depending on the output of the salient region detection performed at 412. Accordingly, at 702 module 108 determines whether a viable salient region has been detected in the input image.

In the present embodiment, module 108 determines that no viable salient region has been detected if either: the output of 412 is that no salient region (or object) can be detected in the input image; or the output of 412 is that the salient region (or object) in the input image exceeds a threshold size. Various threshold sizes may be applied, however in certain implementations module 108 is configured to apply a threshold size of 80%. That is, if the size of the salient region (or object) that is detected is greater than 80% of the size of the input image, module 108 will determine that no viable salient region has been detected.

If no viable salient region has been detected, processing proceeds to 704. In this case module 108 will generate a single crop candidate according to a first candidate generation method (which includes operations 704 to 716 discussed below).

If a viable salient region has been detected, processing proceeds to 720. In this case module 108 will generate multiple crop candidates according to a second candidate generation method (which includes operations 720 to 730 discussed below).

At 704, no viable salient region has been detected in the input image. In this case, module 108 determines whether a target aspect ratio has been defined for the input image. In the present embodiment, and as described above, a target aspect ratio may be defined as the aspect ratio of the input image or an alternative aspect ratio (e.g. that a user has manually entered/selected). If a user has selected an option indicating that the target aspect ratio should be automatically determined (or module 108 is configured to automatically determine a target aspect ratio by default), no target aspect ratio is defined for the input image.

If, at 704, a target aspect ratio has been defined for the input image, processing proceeds to 706. At 706, module 108 calculate a single crop candidate. The single crop candidate is the maximum central crop at the defined aspect ratio—that is, a crop that centred on the centre of the input image (as rotated at 408 if applicable), has the defined target aspect ratio, and extends the width and/or height of the input image.

At 708, module 108 returns the crop candidate calculated at 706 (or data defining that crop candidate).

If, at 704, no target aspect ratio is defined for the input image, processing proceeds to 710. At 710, module 108 calculates the aspect ratio of the input image.

At 712, module 108 determines a target aspect ratio for the crop candidate. In the present embodiment, module 108 determines the target aspect ratio by selecting an aspect ratio from a predefined list of aspect ratios. Specifically, module 108 selects the target aspect ratio as the aspect ratio in the predefined list that is closest to the input image aspect ratio (as calculated at 712). In the present embodiment, the predefined list of aspect ratios includes the following aspect ratios: [1:1, 2:3, 3:2, 4:5, 5:4, 9:16, 16:9]. The predefined list may, however, include additional, fewer, and/or alternative aspect ratios.

At 714, module 108 calculate a single crop candidate.

The single crop candidate is the maximum central crop at the aspect ratio determined at 712—that is, a crop that centred on the centre of the input image (as rotated at 408 if applicable), has the aspect ratio determined at 712, and extends the width and/or height of the input image.

Processing then proceeds to 716 where the crop candidate calculated at 714 (or data defining that crop candidate) is returned.

At 720, a viable salient region has been detected. In this case, module 108 determines whether a target aspect ratio has been defined for the input image (e.g. as per 704 described above).

If, at 720, a target aspect ratio has been defined for the input image, processing proceeds to 722. At 722, module 108 calculates a set (e.g. a list or other data structure) of seed points. Each seed point is a point (defined, for example, by an (x,y) coordinate pair) about which a set of crop candidates will be based.

In the present embodiment, module 108 calculates the set of seed points to include a central seed point (which is calculated as the central point of the salient region that has been detected) and a plurality of offset seed points (each offset seed point defining a point that is offset from the central seed point). In the present embodiment, the offset seed points include: a left seed point (which is calculated as a point to the left of the central seed point); a right seed point (which is calculated as a point to the right of the central seed point); and a top seed point (which is calculated as a point above the central seed point). Module 108 may be configured to calculate the left, right, and top seed points based on the central seed point in various ways. For example, module 108 may adjust the relevant x or y coordinate of the central seed point by a predefined percentage. For example, if the central point has coordinates $(x_c, y_c)$, the input image has a width w and a height h, and the predefined percentage is, then module 108 may calculate: the left seed point to have coordinates $((x_c-W^*t), y_c)$; the right left seed point to have coordinates $((x_c+W^*t), y_c)$; and the top seed point to have coordinates $(x_c, y_c+H^*t)$. Any appropriate value for t may be used—e.g. 5% (0.05) or an alternative value.

In other embodiments additional or fewer seed points may be generated, and/or seed points may be generated based on different approaches. For example, a set of n seed points may be generated by generating a central seed point as described above and then applying random perturbations to the x and or y coordinates of the central seed point (the random perturbations constrained to a range that is appropriate for the size of the input image).

At 724, module 108 iterates over each seed point generated at 722 and for each seed point generates a subset of crop candidates. For a selected seed point this involves the operations described at 726 and 728.

At 726, and for a selected seed point, module 108 computes a maximum crop bounding box for the selected seed point. The maximum crop bounding box is a bounding box that is centred on the selected seed point, has the defined target aspect ratio, and extends the width and/or height of the input image. The maximum crop bounding box may be computed in the same (or a similar) manner as described above with reference to 706, except instead of the crop being centred on the centre of the input image (as rotated at 408 if applicable) it is centred on the selected seed point.

At 728, and for a selected seed point, module 108 generates a subset (e.g. a list) of crop candidates for the selected seed point. The subset of crop candidates generated at 728 may be referred to a seed point subset. The subset of crop candidates generated at 728 is based on the maximum crop bounding box determined for the selected seed point at 726.

In the present embodiment, module 108 generates the subset of crop candidates at 728 with reference to a set of zoom values. In particular, module 108 generates each crop candidate by applying a zoom value from the set of zoom values to the maximum crop bounding box computed at 726. In one specific example, the set of zoom values includes is (0.875, 0.9, 0.925, 0.95, 0.975, 1.0). The set of zoom values may include additional, fewer, and/or alternative zoom values. By generating crop candidates in this way, each crop candidate remains centred on the selected seed point, retains the defined aspect ratio, and will preserve most (or, for zoom value 1.0, all) of the input image's salient region.

At 730, following the processing of each seed point at 724, module 108 returns a set of crop candidates. The set of crop candidates includes the crop candidates of each subset generated at 728 (or data defining each those crop candidates).

To illustrate this particular embodiment, where a viable salient region exists (as determined at 702) and there is a defined aspect ratio (determined at 720), module 108 generates 24 crop candidates. Specifically, for each of the four seed points (central, left, top, and right) module 108 generates a subset of six crop candidates (one candidate based on each zoom value (0.875, 0.9, 0.925, 0.95, 0.975, 1.0)).

If, at 720, no target aspect ratio has been defined for the input image, processing proceeds to 732. At 732, module 108 determines the orientation of the input image as either portrait (if the image height is greater than its width), landscape (if the image width is greater than its height), or square (if the image height is equal to its width).

At 734, module 108 determines a set of aspect ratios based on the orientation of the input image as determined at 730. In the present embodiment, each possible input image orientation is associated with a predefined set of aspect ratios, each predefined set including two or more aspect ratios. By way of specific example, the predefined sets of aspect ratios may be as follows:

| Orientation | Aspect ratios |
| --- | --- |
| Landscape | [1:1, 3:2, 4:3, 5:4, 16:9] |
| Portrait | [1:1, 2:3, 3:4, 4:5, 9:16] |
| Square | [1:1, 2:3, 3:2, 3:4, 4:3, 4:5, 5:4] |

In alternative embodiments, the predefined set of aspect ratios for a given orientation may include additional, fewer, or alternative aspect ratios. Providing multiple aspect ratios is advantageous as it results in crop candidates of varying aspect ratios, however in some implementations, one or more of the orientations may be associated with a single aspect ratio (in which case crop candidate variation is based on the seed points and zoom values described below).

At 736, module 108 iterates over each aspect ratio in the set of aspect ratios determined at 734. For each aspect ratio, module 108 generates a set of seed points and, for each seed point, a subset of crop candidates. This is described below with reference to operations 738 to 744.

At 738, and for a selected aspect ratio, module 108 calculates a set of seed points. This operation is similar to (or the same as) operation 722 described above and will not be described again. In the present embodiment, and as with operation 722 described above, module 108 calculates the set of seed points to include a central seed point, a left seed point, a right seed point, and a top seed point. In other embodiments additional or fewer seed points may be calculated at 738, and/or seed points may be calculated based on different approaches.

At 740, and for a selected aspect ratio, module 108 iterates over each seed point calculated at 738 and for each seed point generates a subset of crop candidates (which may be referred to as a seed point subset). The operations performed at 740 are similar to those performed at 724 described above.

At 742, and for a selected seed point, module 108 computes a maximum crop bounding box based on the selected seed point and the selected aspect ratio. This is similar to operation 726 described above. At 724, the maximum crop bounding box is a bounding box that is centred on the selected seed point, has the selected aspect ratio, and extends the width and/or height of the input image.

At 744, and for a selected seed point, module 108 generate a subset (e.g. a list) of crop candidates. The subset of crop candidates is based on the maximum crop bounding box determined at 742 and, in the present embodiment, are generated as per operation 728 described above (e.g. based on a set of zoom values). In the present embodiment, the set of zoom values used to generate the subset of crop candidates at 744 is (0.875, 0.9, 0.925, 0.95, 0.975, 1.0). Alternative zoom values may be used.

Once all seed points for all aspect ratios have been processed, processing proceeds to 746. At 746, module 108 returns a set of crop candidates. The set of crop candidates includes the crop candidates of each subset generated at 744 (or data defining those crop candidates) for each aspect ratio.

To illustrate this particular embodiment, where a viable salient region exists (as determined at 702), there is no defined aspect ratio (determined at 720), and the input image is a portrait image, module 108 generates 120 crop candidates. Specifically, for each of the five aspect ratios associated with the portrait orientation (1:1, 2:3, 3:4, 4:5, 9:16), module 108 generates four seed points (central, left, top, and right), and for each of those seed points module 108 generates a subset of six crop candidates (one candidate based on each zoom value (0.875, 0.9, 0.925, 0.95, 0.975, 1.0)).

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by (or in conjunction with) different applications running on the same or different computer processing systems.

The present disclosure provides various user interface examples. It will be appreciated that alternative user interfaces are possible. Such alternative user interfaces may provide the same or similar user interface features to those described and/or illustrated in different ways, provide additional user interface features to those described and/or illustrated, or omit certain user interface features that have been described and/or illustrated.

In the embodiments described above, automatic cropping of an image is performed by a single application 102 running on a single computer processing system 100. Alternatives are, however, possible.

For example, one or more of modules 104, 106, 108, and/or 110 may be distinct applications (running on the same or separate computer processing systems) that interoperate with application 102 to perform the described techniques.

As another example, the functions performed by modules 104, 106, 108, and 110 may be combined together in an auto-crop package that can be used to extend the functionality provided by any appropriate image editing application. In this case the auto-crop packaged may be locally installed on a given end user system, e.g. as a plug-in or extension to an existing image editing application.

As yet another example, the functions performed by modules 104, 106, 108, and 110 may be combined together in an auto-crop service that can be accessed by any appropriate image editing application. For example, the functionality of modules 104, 106, 108, and 110 may be provided by one or more server-side applications. In this case, application 102 may be configured to provide a front end for a user to select one or more images that are to be automatically cropped and (if required) display the resulting cropped image(s) to the user. In order to perform the cropping, however, application 102 will communicate the image(s) (or identifiers of the image(s)) to the server environment (along with a desired aspect ratio if necessary). The server environment then performs the relevant operations before returning a cropped image (or data that application 102 can use to crop the image) to application 102.

Unless otherwise stated, the terms "include" and "comprise" (and variations thereof such as "including", "includes", "comprising", "comprises", "comprised" and the like) are used inclusively and do not exclude further features, components, integers, steps, or elements.

In certain instances the present disclosure uses terms "first," "second," etc. to describe various elements. Unless stated otherwise, these terms are used only to distinguish elements from one another and not in an ordinal sense. For example, a first user input could be termed a second user input or vice versa without departing from the scope of the described examples. Furthermore, when the terms "first", "second", etc. are used to differentiate elements or features, a second user input could exist without a first user input. For example, a second user input could occur before a first user input (or without a first user input ever occurring).

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method for automatically generating a cropped version of an input image, the method including:
   processing the input image to detect a salient region of the input image;
   generating a set of crop candidates based on the salient region of the input image, wherein each crop candidate in the set of crop candidates defines a different image crop and generating the set of crop candidates includes:
      determining a first target aspect ratio;
      determining a first seed point, wherein the first seed point corresponds to a centre of the salient region;
      determining a second seed point, wherein the second seed point is offset from the centre of the salient region;
      generating a first subset of crop candidates based on the first seed point and the first target aspect ratio; and
      generating a second subset of crop candidates based on the second seed point and the first target aspect ratio;
   calculating a set of candidate scores, each candidate score corresponding to a crop candidate in the set of crop candidates;
   selecting a first crop candidate from the set of crop candidates based on the set of crop candidate scores; and
   generating the cropped version of the input image based on the image crop defined by the first crop candidate.

2. The computer implemented method of claim 1, wherein the first target aspect ratio is a defined target aspect ratio.

3. The computer implemented method of claim 1, further including:
   determining a second target aspect ratio;
   generating a third subset of crop candidates based on the first seed point and the second target aspect ratio; and
   generating a fourth subset of crop candidates based on the second seed point and the second target aspect ratio.

4. The computer implemented method of claim 3, wherein determining the first and second target aspect ratios includes:
   determining an orientation of the input image; and
   determining the first and second target aspect ratios based on the orientation of the input image.

5. The computer implemented method of claim 1, wherein generating the first subset of crop candidates is further based on a set of zoom values.

6. The computer implemented method of claim 5, wherein generating the first subset of crop candidates includes:
   calculating a maximum crop bounding box that is centred on the first seed point, has the first target aspect ratio, and extends the width and/or height of the input image; and
   for each zoom value in the set of zoom values, generating a crop candidate by applying a zoom based on the zoom value to the maximum crop bounding box.

7. The computer implemented method of claim 1, wherein prior to processing the input image to detect the salient region of the input image the method further includes:
   determining a rotation correction value for the input image; and
   rotating the input image based on the rotation correction value.

8. The computer implemented method of claim 1, wherein processing the input image to detect the salient region of the input image includes processing the input image using a first trained machine learning model.

9. The computer implemented method of claim 1, wherein calculating a first candidate score for the first crop candidate includes:
   generating a first cropped version of the input image based on the first crop candidate; and
   calculating the first candidate score by processing the first cropped version of the input image using a second trained machine learning model.

10. The computer implemented method of claim 1, further including outputting the cropped version of the input image, and wherein outputting the cropped version of the input image includes one or more of: displaying the cropped version of the input image; saving the cropped version of the input image; publishing the cropped version of the input image; printing the cropped version of the input image; attaching the cropped version of the input image to an electronic communication.

11. A computer processing system including:
   one or more computer processing units; and
   non-transitory computer-readable medium storing instructions which, when executed by the one or more computer processing units, cause the one or more computer processing units to perform a method including:
      processing an input image to detect a salient region of the input image;
      generating a set of crop candidates based on the salient region of the input image, wherein each crop candidate in the set of crop candidates defines a different image crop and generating the set of crop candidates includes:
         determining a first target aspect ratio;
         determining a first seed point, wherein the first seed point corresponds to a centre of the salient region;
         determining a second seed point, wherein the second seed point is offset from the centre of the salient region;
         generating a first subset of crop candidates based on the first seed point and the first target aspect ratio; and
         generating a second subset of crop candidates based on the second seed point and the first target aspect ratio;
      calculating a set of candidate scores, each candidate score corresponding to a crop candidate in the set of crop candidates;
      selecting a first crop candidate from the set of crop candidates based on the set of crop candidate scores; and
      generating a cropped version of the input image based on the image crop defined by the first crop candidate.

12. Non-transitory storage storing instructions executable by one or more computer processing units to cause the one or more computer processing units to perform a method including:
   processing an input image to detect a salient region of the input image;
   generating a set of crop candidates based on the salient region of the input image, wherein each crop candidate in the set of crop candidates defines a different image crop and generating the set of crop candidates includes:
      determining a first target aspect ratio;
      determining a first seed point, wherein the first seed point corresponds to a centre of the salient region;
      determining a second seed point, wherein the second seed point is offset from the centre of the salient region;
      generating a first subset of crop candidates based on the first seed point and the first target aspect ratio; and
      generating a second subset of crop candidates based on the second seed point and the first target aspect ratio;
   calculating a set of candidate scores, each candidate score corresponding to a crop candidate in the set of crop candidates;
   selecting a first crop candidate from the set of crop candidates based on the set of crop candidate scores; and
   generating a cropped version of the input image based on the image crop defined by the first crop candidate.

13. The computer implemented method of claim 1, wherein the second seed point is offset from the first seed point in a first direction, and wherein the method further includes:
   determining a third seed point, wherein the third seed point is offset from the centre of the salient region in a second direction; and
   generating a third subset of crop candidates based on the third seed point and the first target aspect ratio.

14. The computer implemented method claim 13, further including:
   determining a fourth seed point, wherein the fourth seed point is offset from the centre of the salient region in a third direction;
   determining a fifth seed point, wherein the fifth seed point is offset from the centre of the salient region in a fourth direction;
   generating a fourth subset of crop candidates based on the fourth seed point and the first target aspect ratio; and
   generating a fifth subset of crop candidates based on the fifth seed point and the first target aspect ratio.

15. The computer implemented method of claim 1, wherein the second seed point is determined by adjusting the first seed point based on a predefined percentage.

16. The computer implemented method of claim 1, wherein the second seed point is determined by applying random perturbations to the first seed point.

17. The computer implemented method of claim 15, wherein the second seed point is further determined based on a size of the input image.

18. The processing system of claim 11, wherein the method further includes:
   determining a second target aspect ratio;
   generating a third subset of crop candidates based on the first seed point and the second target aspect ratio; and
   generating a fourth subset of crop candidates based on the second seed point and the second target aspect ratio.

19. The non-transitory storage of claim 12, wherein the method further includes:
   determining a second target aspect ratio;
   generating a third subset of crop candidates based on the first seed point and the second target aspect ratio; and
   generating a fourth subset of crop candidates based on the second seed point and the second target aspect ratio.

20. The non-transitory storage of claim 12, wherein the method further includes outputting the cropped version of the input image, and wherein outputting the cropped version of the input image includes one or more of: displaying the cropped version of the input image; saving the cropped version of the input image; publishing the cropped version of the input image; printing the cropped version of the input image; attaching the cropped version of the input image to an electronic communication.

\* \* \* \* \*